Patented Feb. 23, 1937

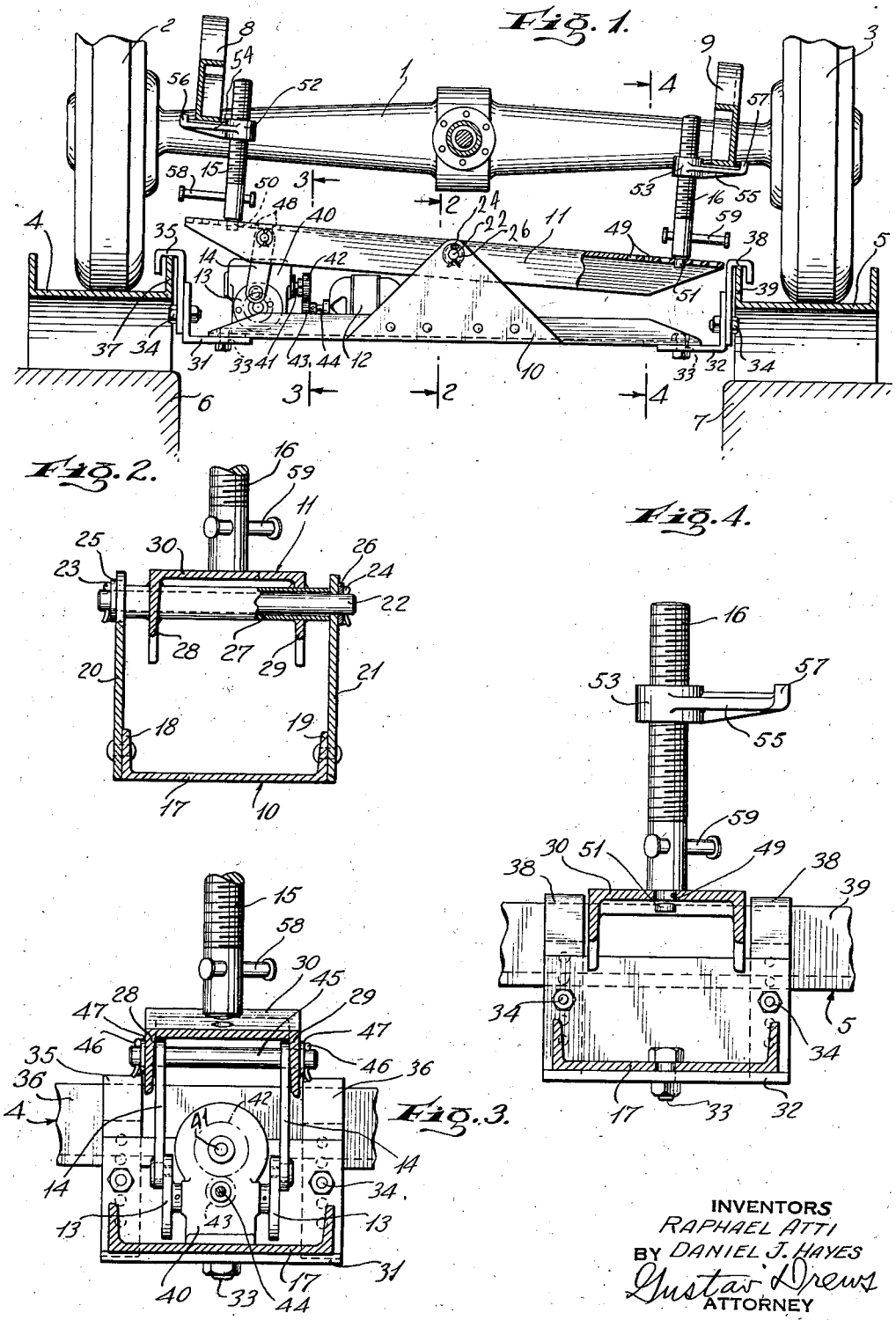

2,072,019

UNITED STATES PATENT OFFICE 2,072,019

AUTOMOBILE ROCKING DEVICE

Raphael Atti, Union City, and Daniel J. Hayes, Newark, N. J., assignors, by mesne assignments, to said Daniel J. Hayes Application October 26, 1933, Serial No. 695,252

6 Claims. (Cl. 73—51)

This invention relates to movable supports for vehicles and more especially to rocking supports for rocking parts of a vehicle relative to its wheel base during lubrication or the like, to locate hidden squeaks, to spread springleaves and to free frozen shackles and the like.

Among the objects of the present invention, it is aimed to provide an improved movable support for a vehicle, such as an automobile whereby the chassis may be rocked relative to its wheel base to locate squeaks, to free frozen shackles, to spread springleaves and to facilitate lubricating the several opposing faces of the movable parts of a vehicle body, which consist essentially in a frame, an eccentric or the like associated therewith and a driving connection for rotating said eccentric operatively connected to the rotating shaft of an electric motor or the like.

These and other features, capabilities and advantages of the invention will appear from the subjoined detail description of one specific embodiment thereof illustrated in the accompanying drawing in which Figure 1 is a fragmental end elevation partly in section showing a car mounted over a lubricating pit and connected to a movable support constituting the present invention;

Fig. 2 is a section on the line 2—2 of Fig. 1;

Fig. 3 is a section on the line 3—3 of Fig. 1; and

Fig. 4 is a section on the line 4—4 of Fig. 1.

In the embodiment shown, there is illustrated the rear axle housing 1 of an automobile and the wheels 2 and 3 thereof mounted on the channel iron rails 4 and 5 mounted on the lateral walls 6 and 7 of a lubricating pit disposed between such walls 6 and 7. The chassis of the car is identified by the channel iron rails 8 and 9 respectively forming the side rails of the chassis of a car.

The present invention consists essentially in a base 10, a movable support 11 pivotally connected to such base 10, a driving motor 12, eccentrics 13, links 14 connecting the movable support to said eccentrics, suitable driving connections between the motor 12 and the eccentrics and connecting brackets 15 and 16 for connecting the movable support 11 with the channel bars 8 and 9 of the automobile.

The base 10 consists essentially of a channel bar 17, see Fig. 2, having riveted to its upstanding flanges 18 and 19 the journal forming plates 20 and 21, the upper ends of which support the shaft 22 which has cotter pins 23, 24 secured to the outer ends thereof to anchor the same against displacement, there being washers 25 and 26 mounted on the shaft 22 between the cotter pins 23 and 24 and the side plates 20 and 21.

On the shaft 22, there is mounted a cylindrical bar 27 located between the side plates 20 and 21 secured to or integral with the downwardly extending flanges 28 and 29 of the channel bar constituting the support 11 and having the intermediate web 30.

The intermediate web of the channel bar 17 is connected at its ends to the angle plates 31 and 32 by means of the bolts 33 which connect the horizontal portion of the angle plates 31 and 32 with the bar 17 along the slot formed in the web of the channel bar 17 according to the width required. The upright portions of the angle bars 31 and 32 are connected by the bolts 34 with hook forming plates, the hook forming plates being arranged in pairs, the plate 31 having two hook forming plates 35 and 36 secured thereto, the upper ends of which grip the flange 37 of the channel rail 4. The angle plate 32 on the other hand is similarly provided with two hook forming plates 38 which grip the flange 39 of the channel bar 5.

The motor 12 is secured to the intermediate web of the channel bar 17. The eccentrics 13 are mounted on the opposite ends of the shaft extending through the casing 40 also mounted on the intermediate web of the channel bar 17.

The shaft of the eccentrics 13, 13 are connected to the shaft 41 of the gear 42 by suitable reduction gearing not shown, which gear 42 in turn meshes with the gear 43 of the shaft 44 of the motor 12. The eccentrics 13, 13 are connected to the downwardly extending flanges 28 and 29 of the channel bar 30 by the links 14, 14, the upper ends of the links being pivotally connected to the shaft 45 extending through the flanges 28 and 29 of the channel bar 30, such shaft 45 being anchored against displacement by the cotter pins 46 secured to its outer ends.

Between the cotter pins 46 and the flanges 28 and 29, there are also here provided the washers, to wit the washers 47. The intermediate web of the channel bar 30 is provided with a plurality of openings 48 adjacent one end and a plurality of openings 49 adjacent its other end, the openings 48 being provided to receive the stud 50 of the pin 15 and the openings 49 being provided to receive the stud 51 of the pin 16 according to the space between the side bars 8 and 9 of the car to be treated.

The pins 15 and 16, as more particularly shown in Figs. 1 and 3, are provided with rounded or bevelled shoulders adjacent the respective studs 50, 51, which rounded or bevelled shoulders are designed to rest upon the beam and provided for limited, universal movement of the pins relative to the beam upon rocking movement thereof, the said studs acting as limiting means for such universal movement in addition to serving as pilot means for quick- easy insertion of the pins in any of the longitudinally disposed recesses on the beam, and also insuring the seating of the pins in such recesses during operation of the device.

The pins 15 and 16 are provided with threads as shown to screw threadedly receive the bosses 52 and 53 of the arms 54 and 55 respectively. The arms 54 and 55 are provided with upwardly extending projections 56 and 57 respectively.

The upper surface of the arm 54 between the projection 56 and the boss 52 forms a seat for engaging the lower surface of the rail 8 and the upper face of the arm 55 between the projection 57 and the boss 53 forms a seat for engaging the lower face of the bar 9. The lower ends of the pins 15 and 16 are provided with the pivotally mounted arms 58 and 59 for actuating the pins in a well known manner to raise or lower the arms 54 and 55 according to the height required to properly engage the side rails 8 and 9. As shown in Figs. 3 and 4, the downwardly extending flanges of the hook portions 35 and 36 are also provided with a plurality of openings to accommodate the bolts 34 according to the distance required between the upper end of the arms 37, 38 and the lower end of the angle bars 31 and 32.

From the foregoing, it will appear that after a car is driven over a lubricating pit onto the tracks 4 and 5, the swaying device can then be adjusted so that the arms 54 and 55 will properly engage the side rails 8 and 9 of the chassis of the vehicle and thereupon when turning on the current of the motor 12, the chassis of the vehicle relative to the wheel base of the vehicle will be rocked laterally about a longitudinally extending axis and thereby function to spread the springleaves of the vehicle, free frozen shackles and locate hidden squeaks with facility and at the same time permit the attendant to apply the lubrication so that it will readily distribute itself across the several opposing faces of the moving parts of the car body, springleaves and the like.

It is obvious that various changes and modifications may be made to the details of construction without departing from the general spirit of the invention as set forth in the appended claims.

We claim:

1. The combination with a pair of vehicle wheel supporting side rails, of a base having adjustable means at its ends removably connected to said side rails to be suspended therefrom, side plates extending upwardly from the intermediate portion of said base, a support pivotally connected to said side plates, connecting means at the ends of said support for connecting said support to the chassis of the vehicle resting on said side rails, and means for rocking said support including an electric motor mounted on said base, eccentric driving means mounted on said base and drivingly connected to said motor, and means for operatively connecting said eccentric driving means with said support.

2. The combination with a pair of vehicle wheel supporting side rails, of a base including a channel bar having lateral upstanding flanges and anchoring plates at its ends removably connected to said side rails to be suspended therefrom, side plates secured to the intermediate portions of said flanges and extending upwardly, a channel bar support having lateral downwardly extending flanges, a shaft for pivotally connecting the intermediate portion of the lateral downwardly extending flanges of said support to said side plates, means for adjustably connecting the ends of said support to the chassis of the vehicle resting on said side rails, means for rocking said support including an eccentric driving device mounted on said base intermediate its lateral flanges, and links for operatively connecting said eccentric device with one end of said support.

3. The combination with a pair of wheel supporting side rails for the wheels of a car or the like, of a car rocking device comprising a base, means for slidably connecting the ends of said base to said side rails, a beam pivotally connected at its middle to said base to be rocked relative to said support and base, said beam extending transversely of the car to be rocked and having engaging means at its ends for engaging the sides of the chassis of the car resting on said support, means for rocking said beam mounted on said base, and means for drivingly connecting said rocking means with said beam.

4. A device for rocking the chassis of an automobile comprising, a base, a beam pivotally mounted on said base for rocking movement relative thereto, means for rocking said pivotally mounted beam relative to said base, and means for actuating said rocking means, said beam being provided with a recess, and vertically adjustable means for engaging the chassis removably mounted in said recess, said vertically adjustable means having a rounded shoulder resting on the beam for limited universal movement relative to said beam on rocking movement thereof, whereby distortion of the chassis is prevented in such rocking movement.

5. A device for rocking the frame of an automobile comprising, a base, a beam pivotally mounted on said base for rocking movement relative thereto, means for rocking said pivotally mounted beam relative to said base, and means for actuating said rocking means, said beam being provided with a plurality of longitudinally disposed recesses, and vertically adjustable means engaging said frame and adapted to be removably mounted in suitable of said longitudinally disposed recesses for different sizes of frames, said vertically adjustable means having rounded shoulders resting on said beam for limited universal movement thereon, whereby distortion of the frame is prevented on rocking movement of said beam.

6. A car rocking device comprising a base, a beam pivoted on said base for rocking movement relative thereto, means for rocking said beam relative to said base, said beam being provided with a plurality of longitudinally disposed recesses, and vertically adjustable means for engaging the frame of the car removably mounted in suitable of said longitudinally disposed recesses for different sizes of frames, said vertically adjustable means having rounded shoulders resting on said beam for limited universal movement thereon, whereby to engage the frame of the car without lateral thrust on rocking movement of said beam in order to prevent distortion of the frame in such rocking movement.

RAPHAEL ATTI.
DANIEL J. HAYES.